United States Patent [19]

Sims, Jr. et al.

[11] Patent Number: 4,566,049

[45] Date of Patent: Jan. 21, 1986

[54] TRANSDUCER HEAD INDEXING DEVICE AND METHOD

[75] Inventors: Dewey M. Sims, Jr., Wayne; Robert T. Haas, Milan, both of Mich.

[73] Assignee: Northern Telecom Limited, Montreal, Canada

[21] Appl. No.: 444,868

[22] Filed: Nov. 29, 1982

[51] Int. Cl.[4] .................. G11B 21/08; G11B 21/10; G11B 21/24

[52] U.S. Cl. .................................. 360/106; 360/109

[58] Field of Search ............... 360/106, 109, 105, 78, 360/104, 98, 97, 99; 369/230, 215, 219, 222, 224

[56] References Cited

U.S. PATENT DOCUMENTS

| | | | |
|---|---|---|---|
| 3,661,397 | 5/1972 | Worth et al. | 274/9 RA |
| 3,761,644 | 9/1973 | Camras | 179/100.2 CA |
| 3,833,923 | 9/1974 | Camras et al. | 360/106 |
| 3,839,735 | 10/1974 | Denk | 360/106 |
| 4,003,092 | 1/1977 | Hirata . | |
| 4,144,549 | 3/1979 | Burdorf et al. . | |
| 4,275,427 | 6/1981 | Bjordahl | 360/106 |
| 4,333,116 | 6/1982 | Schoettle et al. | 360/78 |

FOREIGN PATENT DOCUMENTS 1474953  5/1977  United Kingdom .

Primary Examiner—Stuart N. Hecker
Assistant Examiner—Benjamin Urcia
Attorney, Agent, or Firm—Schwartz, Jeffery, Schwaab, Mack, Blumenthal & Evans

[57] ABSTRACT

A method and an apparatus for indexing a transducer head, such as is used in magnetic tape recording, is disclosed. A transducer head is mounted on a head carrier. The carrier supports a cam follower and the carrier and cam follower are resiliently biased against a cam. A gear train, including both a motor and the above-mentioned cam are mounted on a common support device. The support device is pivotally mounted. The head can consequently be initially indexed to a given track on the tape by pivoting the support device; this has the effect of moving the entire cam up and down and consequently the head as well. Once the head has been indexed to a given track it is moved between the various tracks by rotating the cam via the gear train.

5 Claims, 8 Drawing Figures

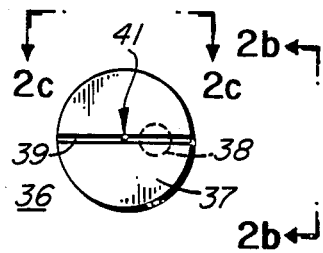
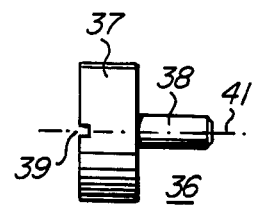
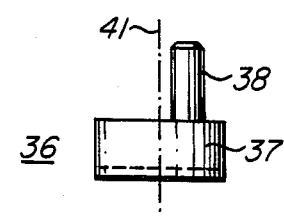
FIG. 2a  FIG. 2b  FIG. 2c
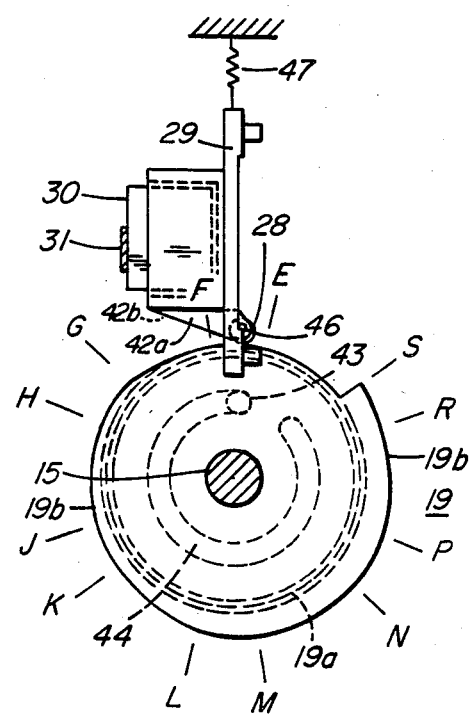
FIG. 4
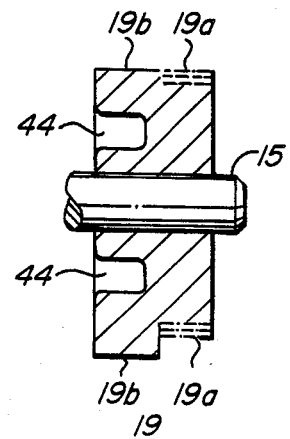
FIG. 5a
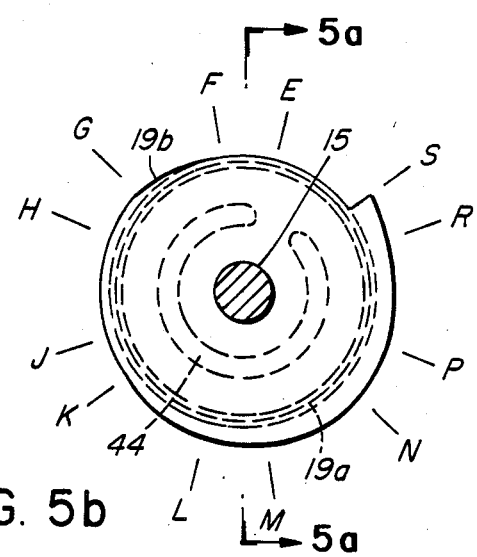
FIG. 5b

TRANSDUCER HEAD INDEXING DEVICE AND METHOD

BACKGROUND OF THE INVENTION

This invention relates generally to magnetic recording, and more particularly to head indexing devices for use with magnetic tape.

It is known to record data on parallel tracks on a recording medium such as magnetic tape. It is also known to access these various tracks by moving a transducer head across the tape to selectively access a given track. U.S. Pat. No. 4,275,427 dated June 23, 1981 to J. Bjordahl discloses one such system to which attention is directed.

U.S. Pat. No. 3,839,735 dated Oct. 1, 1974 to J. P. Denk discloses yet another such system to which attention is directed.

The use of parallel high density tracks (center line to center line of the tracks being less than 0.020 inches) on the magnetic tape requires the precise reproducible indexing of the transducer head to ensure that the head is accessing the proper track and is properly aligned with it. In the past this has involved the use of an electric stepper motor having sufficient torque (e.g. greater than two ounce-inches), having very small step angles (approximately 1.8°), and having a precision (no backlash) linkage mechanism between the motor and the head. This linkage mechanism had to be precision made so as to enable precise control of the head position.

As well as the precision involved in the individual components (i.e. the motor, the linkage mechanism, and the head) the mounting, the interconnecting, and the adjustment of all these components also required a great degree of precision.

Past designs have been limited in their accuracy by problems such as the following:

1. The total run out of the electric shaft can produce an error of approximately 0.002 inches.
2. The end play of the electric motor shaft can produce an error of approximately 0.001 inches or more.
3. The angular indexing change due to friction in the system can cause an index error of approximately 0.001 inches.
4. The angular indexing change due to inertia in the system can cause an index error of approximately 0.001 inches.
5. The step accuracy of the stepper motor can cause an error of approximately 0.001 inches.
6. The pitch accuracy of the screw or spiral cam can cause an error of approximately 0.0005 inches.
7. Due to the variety of materials used, a variation in the temperature (e.g. 50° F. to 100° F.) can cause an indexing error of approximately 0.002 to 0.004 inches (depending upon materials).
8. Manufacturing difficulties of reproducibly setting up the stepper motor to match with the desired home position can cause an initial error of 0.002 inches or more.

SUMMARY OF THE INVENTION

A general trend has been the increase of track density; that is, more tracks on the same size of tape. To achieve a higher track density the transducer head has to be indexed with ever increasing degrees of accuracy. It is an object of the present invention to index the head with an accuracy of approximately ±0.0006 inches. According to the present invention, this accuracy comes largely from the accuracy of the cam itself (which is approximately ±0.0004 inches) and from the cam follower (which is approximately ±0.0002 inches).

The present invention additionally reduces the complexity of the adjustments relative to those previously required in interconnecting the individual components. To this end, according to the present invention, a gear train, including an electric motor and a cam, are all mounted together, as one subassembly, on a supporting member. One end of the supporting member is pivotably mounted to the tape machine itself, and the other end is fixed by an eccentric; as the eccentric is rotated, the end of the supporting member contacting the eccentric is moved up or down. As a result, the whole subassembly moves about its pivot point. This simple movement has the end result of adjusting the relationship of the head to the tape. This allows a relaxation in the tolerance limits in production and allows for a simple and accurate fine adjustment of the head position, relative to the tape.

It should be noted that the head is adjusted, in the factory, to a given location on a reference tape. It is during this initial factory adjustment that the supporting member is pivoted. Once the head is positioned correctly, relative to the reference tape, the eccentric is fixed (e.g. by quick setting glue) and the head is then moved only by means of the electric motor and the gear train.

Stated in other terms, the present invention is an apparatus for positioning a transducer head relative to a recording medium wherein the head is carried by a carrier mounted for linear translational movement substantially parallel to a surface of the recording medium and the carrier supports a cam follower means, the carrier and the cam follower means resiliently biased against a camming means, the apparatus comprising: a gear train, including both a motor and the camming means, all pivotally mounted as a single unit such that the camming means contacts the cam follower means and the motor controllably drives the camming means, and means for controllably pivoting the entire gear train such that the head can be controllably linearly translated substantially parallel to the surface of the recording medium either by pivoting the entire gear train or by rotatably driving the camming means.

Stated in yet other terms, the present invention is a method of positioning a transducer head relative to a recording medium wherein the head is carried by a carrier mounted for linear translational movement substantially parallel to a surface of the recording medium and the carrier supports a cam follower means, the carrier and the cam follower means resiliently biased against a camming means, whereby the rotation of the camming means to different angular positions causes the cam follower means, and consequently the head, to translate linearly substantially parallel to the surface of the recording medium, the method characterized by: pivotally mounting the camming means and the drive means therefor on a common support means provided with means for controllably pivoting the common support; and controllably linearly translating the transducer head, substantially parallel to the surface of the recording medium, by either (a) pivoting the common support about its pivot point, or (b) rotating the camming means via the drive means.

BRIEF DESCRIPTION OF THE DRAWINGS

The invention will now be described in more detail with reference to the accompanying drawings, wherein like parts in each of the several figures are identified by the same reference character, and wherein:

FIGS. 2a, 2b, and 2c are front, side, and top views respectively of one component of FIG. 1;

FIG. 4 is a simplified illustration depicting the indexing of a tape head; and

FIGS. 5a and 5b, are sectional and front views, respectively, of the cam and shaft depicted in FIG. 4.

DETAILED DESCRIPTION

Figure 1:
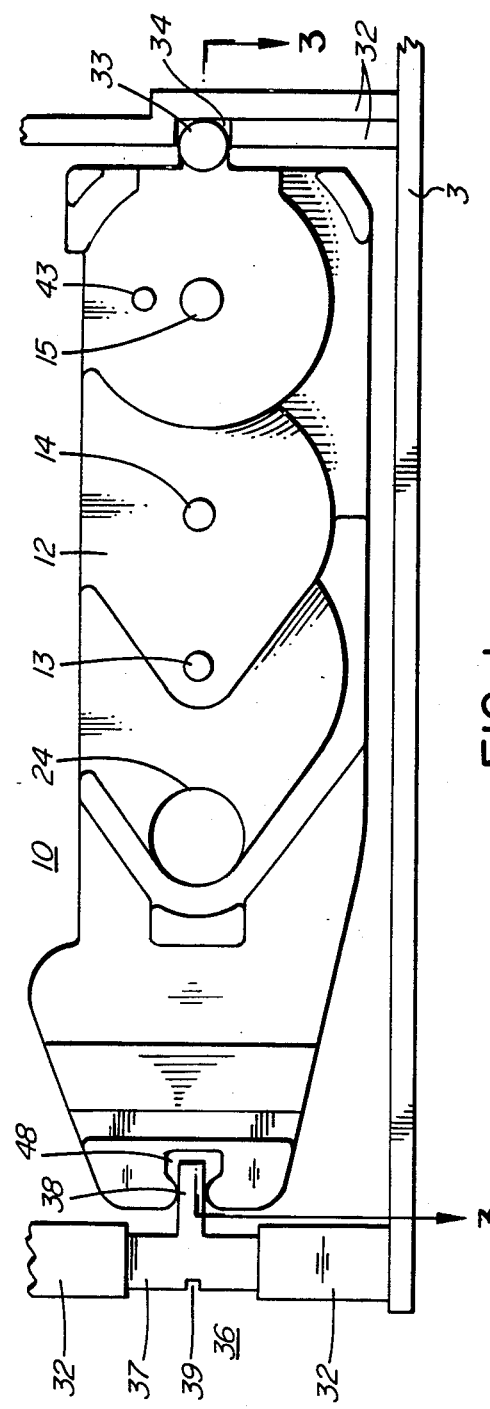
FIG. 1 is a simplified representation of a part of the present invention.
Figure 3:
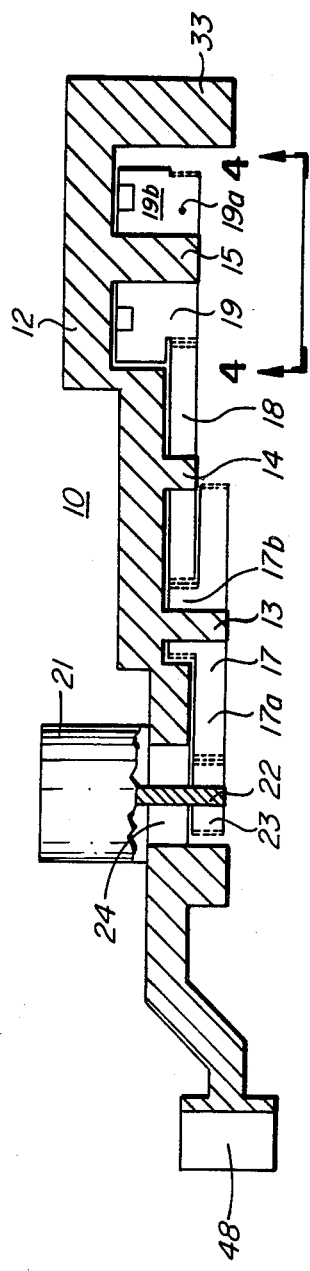
FIG. 3 is a simplified view of the FIG. 1 embodiment taken along the section line 3—3 of FIG. 1, and additionally showing gear wheels and a motor.

FIG. 1 depicts in simplified fashion an apparatus 10 for positioning a magnetic transducer 30 (FIG. 4). Magnetic transducer (head) 30 is designed to read and write information on a magnetic tape. In the side view depicted in FIG. 4, the movement provided to the transducer 30 is an up and down movement. It is suggested that FIGS. 1 and 3 be referenced together to aid in understanding the operation of the present invention. Note that FIG. 3 additionally depicts the gear wheels 17, 18, and 19 and motor 21 (only partly in section) with its shaft 22 and gear wheel 23.

Apparatus 10 comprises a gear frame 12 supporting shafts 13, 14, and 15, about which gears 17, 18, and 19 respectively, rotate. Motor 21 (FIG. 3) is mounted to frame 12 and its shaft 22 protrudes through an aperture 24 in frame 12 and supports a gear wheel 23 for driving the gear train 26 (note: gears 23, 17, 18 and 19 are referred to collectively as gear train 26). Gear wheel 17 has a large diameter toothed portion referenced generally as 17a and has a smaller diameter toothed portion referenced generally as 17b.

Gear wheel 19 includes as an integral part of itself a toothed portion 19a and a camming surface 19b (attention is directed to FIGS. 5a and 5b). Camming surface 19b interacts with cam follower 28 (FIG. 4) so as to position head carrier 29 and consequently the magnetic transducer (head) 30 itself.

In FIG. 1, gear frame 12 is pivotally connected to the equipment housing 32 (only partially depicted) via arm 33 fitting into a recess 34 in housing 32.

The other end of frame 12 is secured to equipment housing 32 by means of eccentric 36. Eccentric 36 (attention is also directed to FIGS. 2a, 2b and 2c) comprises a disk portion 37 and a stud portion 38. Stud 38 is mounted, as shown, off-center from the center of disk 37; consequently, as disk 37 rotates about its geometric center, stud 38 follows the path of a circle. Eccentric 36 is rotated by a screwdriver or similar instrument inserted into slot 39.

As shown in FIG. 1, stud 38 protrudes into slot 41 provided in frame 12. As eccentric 36 is rotated about its geometric axis stud 38 is caused to move in a generally circular motion thereby causing frame 12 to move in an up and down motion about its pivot point (i.e. arm 33).

FIGS. 2a, 2b, and 2c depict eccentric 36 in more detail. Eccentric 36 comprises disk portion 37 and stud portion 38. The geometric axis of disk portion 37 is depicted by the dashed line referenced generally as 41 (and shown simply as a point in FIG. 2a). As disk portion 37 rotates about axis 41, stud 38 follows the path of a circle.

FIG. 4 depicts gear wheel 19 and its interaction with head carrier 29 in more detail. The view in FIG. 4 is as taken along section line 4—4 in FIG. 3, omitting gear wheel 18 and additionally including head carrier 29, its associated equipment, and a section of tape 31. Note that the toothed portion 19a is indicated generally by three concentric broken lines.

Head carrier 29 supports a magnetic transducer 30 and is mounted (by means not shown) so as to have only an up and down movement. Flanges 42a and 42b (of which only 42a can be seen in this view) support cam follower 28. Cam follower 28 is rotatably mounted between flanges 42a and 42b by spindle 46 and bears against camming surface 19b of gear wheel 19; spring 47 (shown schematically) exerts a force on head carrier 29 biasing it downwards toward gear wheel 19.

As shown in FIG. 4, gear wheel 19 is at one of its extremes of travel and head carrier 29 is consequently at its lowest position. Gear wheel 19 cannot move any more in a counter clockwise (CCW) direction that that shown in FIG. 4 since pin 43 (protruding from gear frame 12) is contacting the end of circular slot 44 in gear wheel 19. Gear wheel 19 can, however, move approximately 300° in a clockwise (CW) direction until pin 43 contacts the other end of slot 44 and limits movement in that direction. It will be noted that gear wheel 19, and camming surface 19b, is designed to be rotated to one of six positions, each approximately 60° apart. These six positions are the zones between the following pairs of reference characters: E and F; G and H; J and K; L and M; N and P; and R and S. In other words, as shown in FIG. 4, gear 19 is in a first position with the zone between the characters E and F being at the top (12 o'clock position) and being the surface against which cam follower 28 rests. The second position occurs with gear wheel 19 rotated 60° C.W. from that position depicted in FIG. 4, and consequently the zone between characters G and H is then at the top (12 o'clock position) and is then the surface against which cam follower 28 rests. Similarly, with the zone between characters J and K defining a third position; the zone between characters L and M defining a fourth position; the zone between characters N and P defining a fifth position; and finally, the zone between characters R and S defining a sixth position.

FIGS. 5a and 5b depict gear wheel 19 in somewhat more detail. FIG. 5b is the same view as in FIG. 4, and FIG. 5a is a cross-sectional view of FIG. 5b as taken along section line 5a—5a.

Particular attention is directed to camming surface 19b itself. From FIG. 5b it can be seen that, beginning at letter E, and going along camming surface 19b in a counter clockwise direction, surface 19b gradually and monotonically increases in distance from the center of shaft 15. It should be noted however, that the six zones of surface 19b referred to previously (i.e. E to F; G to H; J to K; L to M; N to P; and R to S) are each a constant distance from the center of shaft 15 for their duration i.e. they each have a constant radius for their duration. More specifically, zone E to F has a nominal radius of 0.425 inches;
zone G to H has a nominal radius of 0.445 inches;
zone J to K has a nominal radius of 0.465 inches;
zone L to M has a nominal radius of 0.485 inches;
zone N to P has a nominal radius of 0.505 inches;

zone R to S has a nominal radius of 0.525 inches.

As a result of these constant radius zones (each extending approximately 20°), the assembly accuracy associated with positioning gear wheel 19 (and consequently camming surface 19b) is reduced since the location to which the gear wheel 19 must be rotated has effectively been enlarged to be included anywhere within the zone defined by the pairs of letters (e.g. anywhere within the zone E to F, etc.).

Returning to FIG. 3, in one embodiment constructed by the inventors, motor shaft 22 of motor 21 had an output torque of approximately 2 ounce-inches. Gear wheel 23 had a 0.2917 inch pitch diameter, gear wheel 17 had a 1.1666 inch pitch diameter on its large gear 17a and a 0.2708 inch pitch diameter on its small gear 17b, gear wheel 18 had a 1.000 inch pitch diameter, and gear wheel 19a had a 0.8125 inch pitch diameter. The result of this gear train was an output torque of 24 ounce-inches. It should also be noted that two revolutions of motor shaft 22 resulted in a rotation of gear wheel 19 of approximately 60°.

What is claimed is:

1. An apparatus for positioning a transducer head relative to a recording medium wherein
    said head is carried by a carrier mounted for linear translational movement substantially parallel to a surface of said recording medium,
    and said carrier supports a cam follower means,
    said carrier and said cam follower means resiliently biased against a camming means,
    said apparatus comprising:
    a gear train, including both a motor and said camming means,
    all pivotally mounted as a single unit such that said camming means contacts said cam follower means and the motor controllably drives said camming means via said gear train, and
    means for controllably pivoting the entire gear train, and adjustments can be made to the position of said head relative to said medium
    such that said head can be controllably linearly translated substantially parallel to said surface of the recording medium either by pivoting said entire gear train or by rotatably driving said camming means.

2. The apparatus of claim 1 wherein said gear train includes a set of inter-meshing gears, the first gear of which is driven by the shaft of said motor, and the last gear of which supports said camming means, and said entire gear train is pivotally mounted in such a fashion that said camming means is closer to the pivot point than to the distal end.

3. The apparatus of claim 2 wherein said gear train, including said motor and said camming means are mounted on a common support means, said support means being pivotally mounted at one end and having its distal end mounted for limited movement by an eccentric means so as to move said support means about said pivot point thereby moving said camming means and consequently said transducer head.

4. The apparatus of claim 3 wherein said camming means includes a plurality of zones each of an unique constant radius.

5. A method of positioning a transducer head relative to a recording medium wherein
    said head is carried by a carrier mounted for linear translational movement substantially parallel to a surface of said recording medium,
    and said carrier supports a cam follower means,
    said carrier and said cam follower means resiliently biased against a camming means,
    whereby the rotation of said camming means to different angular positions causes said cam follower means, and consequently said head, to translate linearly substantially parallel to said surface of the recording medium,
    said method characterized by:
    pivotally mounting said camming means and the drive means therefor on a common support means provided with means for controllably pivoting said common support means and
    controllably linearly translating said transducer head substantially parallel to said surface of said recording medium, by either
    (a) pivoting said common support about its pivot point, or
    (b) rotating said camming means via said drive means.

* * * * *